United States Patent [19]
Cooper

[11] 4,286,821
[45] Sep. 1, 1981

[54] AUTOMOBILE BODY WITH A RETRACTABLE HARD TOP ROOF

[76] Inventor: Herbert Cooper, 1 Tom's Point La., Port Washington, N.Y. 11050

[21] Appl. No.: 134,047

[22] Filed: Mar. 26, 1980

[51] Int. Cl.³ ............................................. B60J 7/16
[52] U.S. Cl. ..................................... 296/216; 296/27
[58] Field of Search ........................ 296/27, 107, 216

[56] References Cited

U.S. PATENT DOCUMENTS

| | | | |
|---|---|---|---|
| 2,686,076 | 8/1954 | Helser | 296/107 |
| 3,021,174 | 2/1962 | Rund | 296/107 |
| 3,180,677 | 4/1965 | Scott | 296/107 |
| 3,655,238 | 4/1972 | Stewart | 296/107 |
| 3,823,977 | 7/1974 | Fioravanti | 296/107 |
| 3,861,572 | 1/1975 | Norris | 296/27 |

*Primary Examiner*—Joseph F. Peters, Jr.
*Assistant Examiner*—John A. Carroll
*Attorney, Agent, or Firm*—Allison C. Collard; Thomas M. Galgano

[57] ABSTRACT

An automobile body includes a front windshield and a passenger compartment having a pair of body side panels between which is disposed a front seat section and a rear seat section, and a collapsible, segmented convertible hard top roof. The roof is mounted for manually-activated movement between a raised, non-collapsed position, in which the roof extends from an upper edge of the front windshield rearwardly over the front and rear sections of the passenger compartment at a sufficient height so that the body assumes the general configuration of a hard top four passenger sedan or coupe body, and a lowered collapsed position, in which the roof extends substantially over only the rear seat section of the passenger compartment at a lower height such that it lies substantially flush with the upper edges of the body side panels so that the body assumes the general configuration of a two-passenger, open top roadster.

6 Claims, 21 Drawing Figures

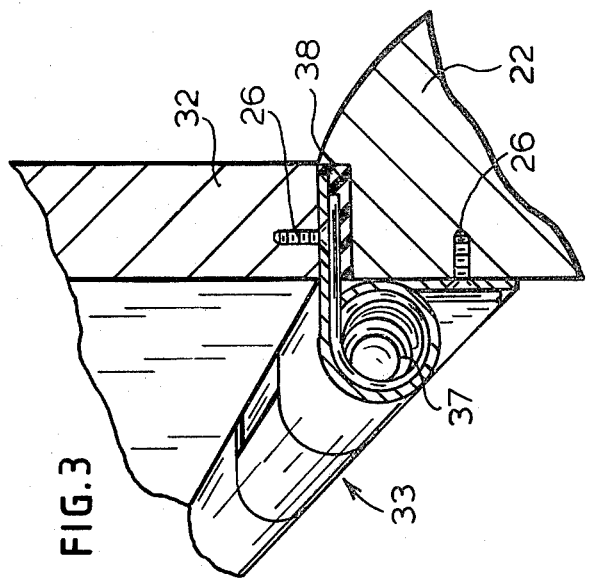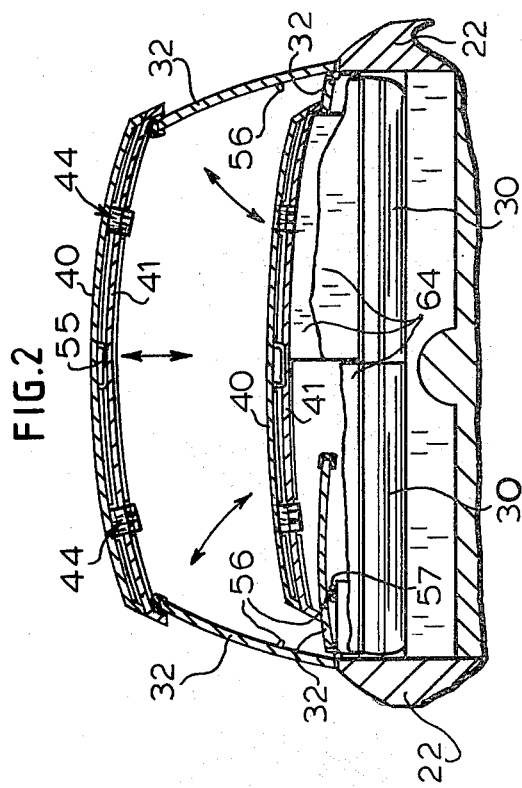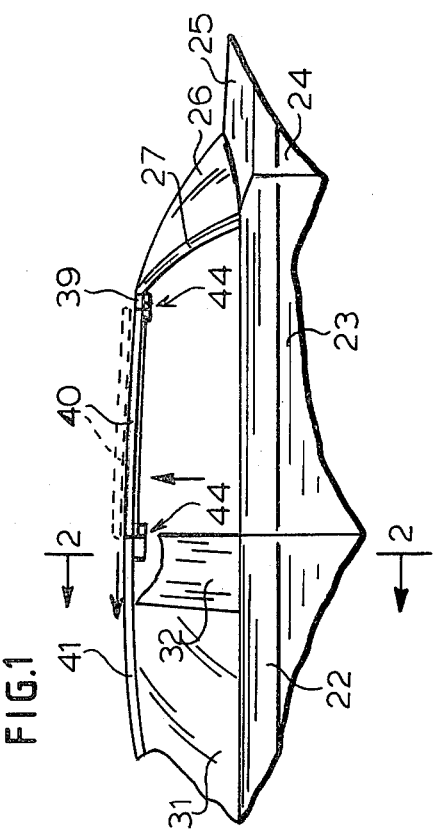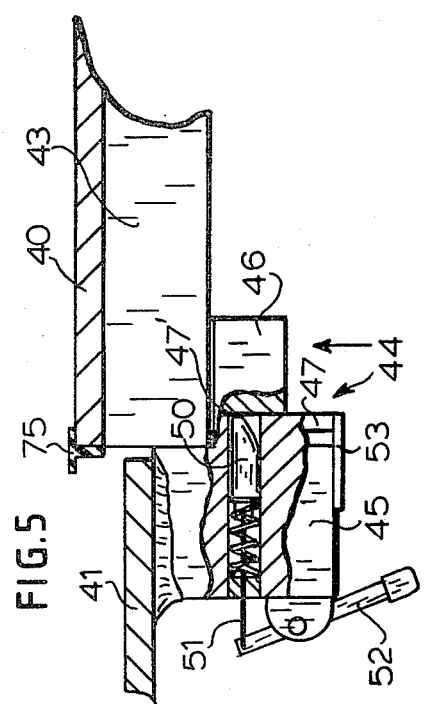

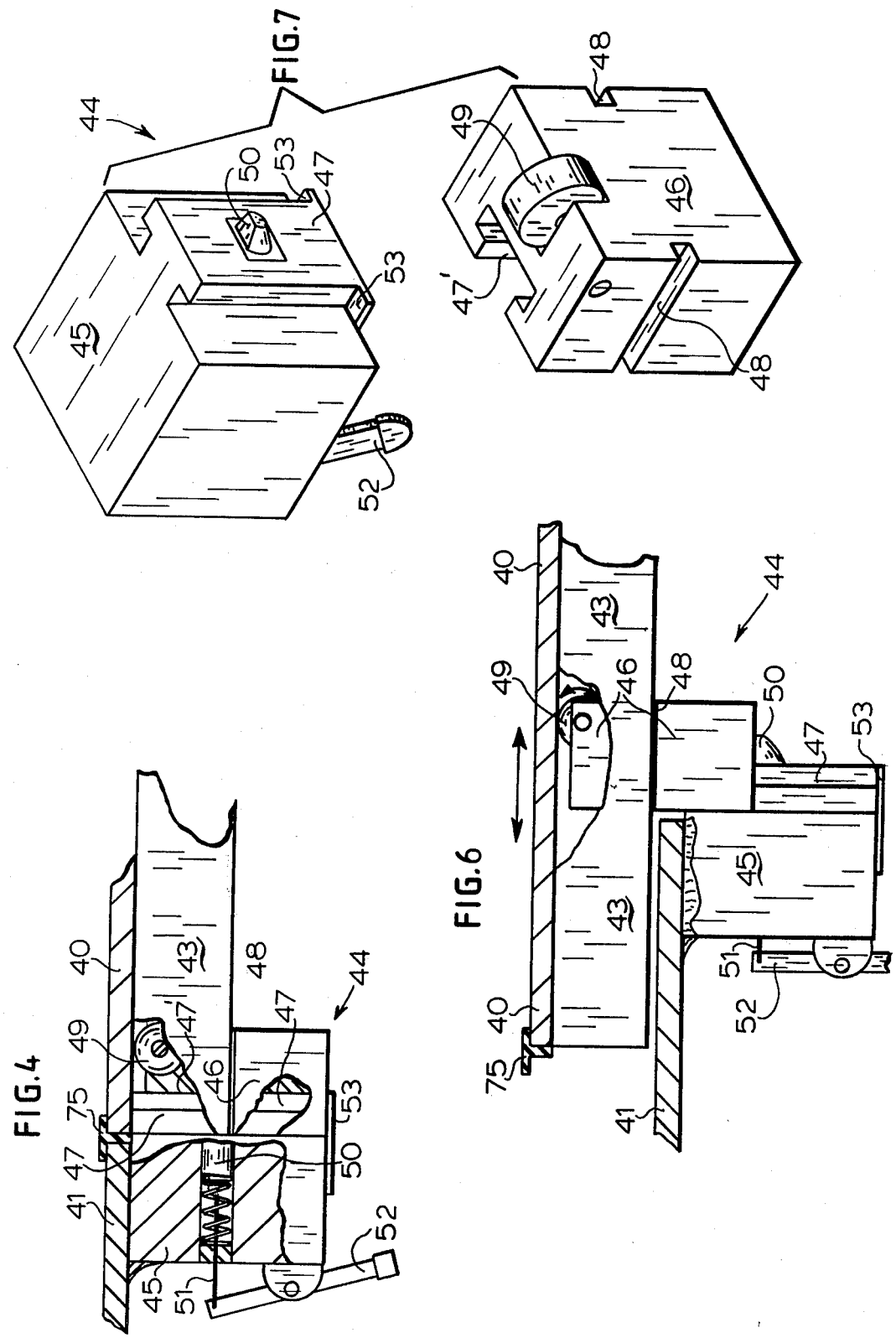

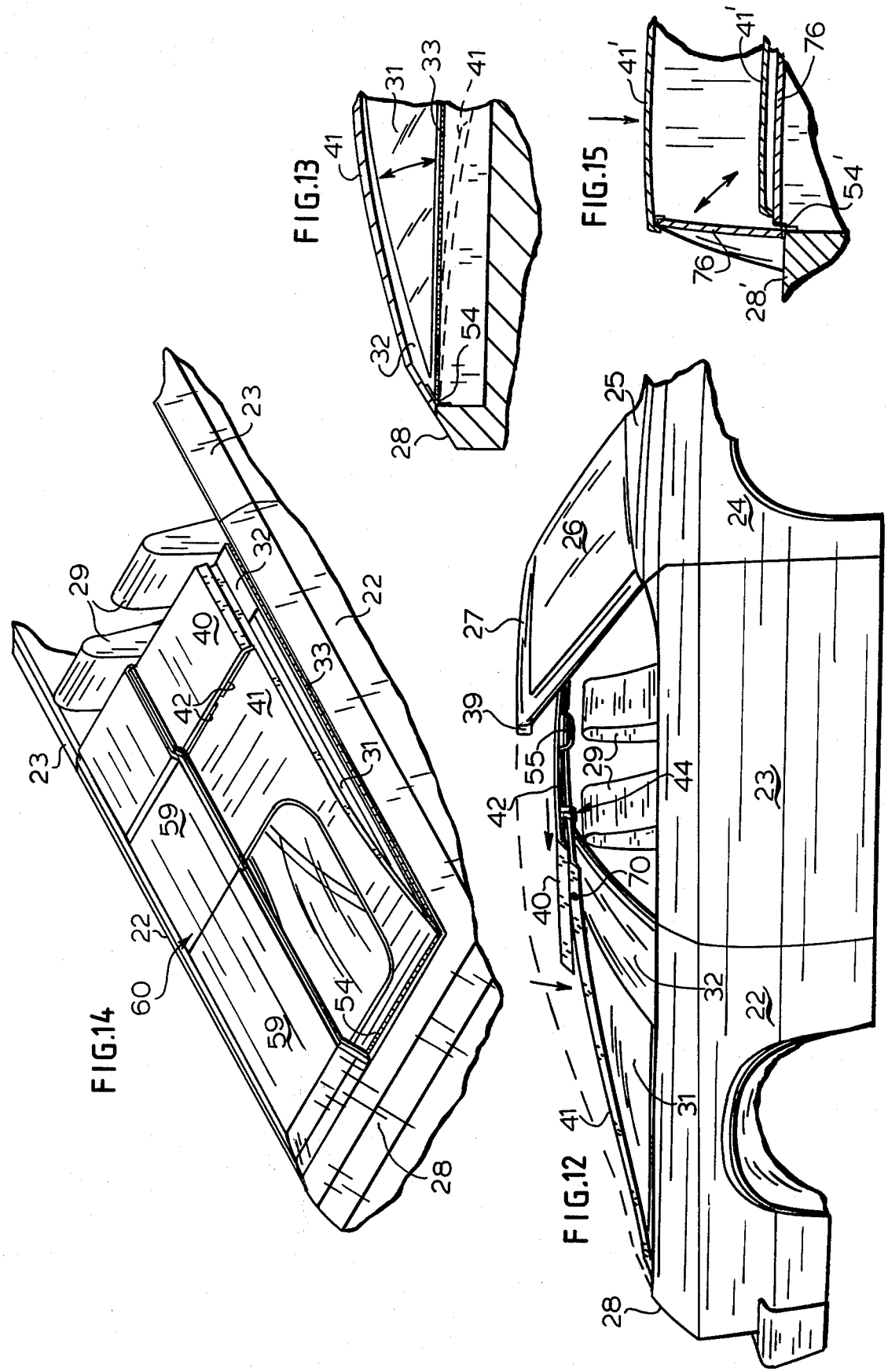

AUTOMOBILE BODY WITH A RETRACTABLE HARD TOP ROOF

The present invention relates to a convertible top for an automobile. More particularly, it relates to a collapsible, segmented convertible hard top roof for converting a four passenger sedan or coupe into a two seater, open top roadster.

Various types of convertible car tops of both the hard and collapsible fabric type are well known and widely used in the automobile industry. However, a major disadvantage of the fabric convertible top is that it is relatively easily torn or damaged as a result of which, it has a relatively short life span. On the other hand, while removable hard tops obviate this problem, they present a storage problem.

It has therefore been previously proposed to combine the better features of both of these convertible top types so as to produce a collapsible or retractable convertible hard top (see, e.g., U.S. Pat. Nos.: 2,759,761; 2,768,025; 2,812,975; 2,841,441; 2,860,004; 2,860,914; 2,869,923; 3,057,656; 3,059,962; 3,195,947; 3,278,221; 3,536,354; and 3,575,464). Nevertheless, these prior art attempts have been found to have certain drawbacks. More specifically, some require motorized actuation. Others have rather complicated and cumbersom constructions. Furthermore, so far as is known, no presently available retractable hard top permits conversion of a four passenger hard top sedan or coupe into a two seater open top roadster as herein proposed.

It is therefore an object of the present invention to provide a novel retractable hard top which permits conversion of a four passenger hard top sedan or coupe into a two seater, open top roadster.

It is a further object of the present invention to provide a novel, retractable car hard top which is of relatively simple construction and design and which is manually actuable, durable and reliable in operation.

It is another object of the present invention to afford such a novel retractable hard top which takes advantage of the natural lines and contours of today's cars and is economical to produce.

Certain of the foregoing and related objects are readily attained in an automobile body of the type having a front windshield and a passenger compartment which includes a pair of body side panels between which is disposed a front seat section and a rear seat section and a collapsible, segmented convertible hard top roof. The roof is mounted for manually-activated movement between a raised, non-collapsed position, in which the roof extends from an upper edge of the front windshield rearwardly over the front and rear sections of the passenger compartment at a sufficient height so that that body assumes the general configuration of a hard top four passenger sedan or coupe body, and a lowered collapsed position, in which the roof extends substantially over only the rear seat section of the passenger compartment at a lower height such that it lies substantially flush with the upper edges of the body side panels so that the body assumes the general configuration of a two-passenger open top roadster.

Most advantageously, the roof has a front panel and a rear panel which, when the roof is disposed in the raised, non-collapsed position, extend over the front seat section and the rear seat section, respectively. The roof also preferably includes means for pivotably mounting the rear panel along a rear edge thereof to a rear portion of the body so as to permit movement thereof between the raised and collapsed positions relative to the rear seat section. Means are also advantageously provided for coupling the front panel to the rear panel for movement between the raised, non-collapsed position in which the front panel lies between the rear panel and the front windshield, and the lower, collapsed position, in which the front panel is slid upwardly and rearwardly such that it is superimposed over the rear panel so as to uncover the front seat section.

In a preferred embodiment of the invention, the roof includes a pair of rear, side window panels disposed on opposite sides of the roof rear panel along one of the body side panels. In addition, means are provided for pivotably mounting the rear, side window panels along a lower edge thereof to the associated body side panel for movement between the raised, non-collapsed position, in which the rear, side window panels assume a generally vertical disposition for supporting the rear panel and a lowered collapsed position, in which the rear side window panels are pivoted inwardly towards the interior of the body so that they assume a generally horizontal disposition and lie generally flush with the upper edge of the body side panels.

Most desirably, the means for pivotably mounting the roof rear panel and the rear, side window panels comprise an elongated hinge. It is also advantageous if the automobile body additionally including means for releasably securing the roof in its raised, non-collapsed position, as well as its lowered collapsed position.

In a particularly preferred embodiment, the automobile body additionally includes a cap for covering the roof when in the lower, collapsed position thereof, which may comprise a segmented rigid plastic sheet. It is also preferable that the passenger compartment have at least one fold down rear seat having a rear side and a support element secured to the rear side of the seat which, when the seat is folded down, projects upwardly in a generally vertical disposition so as to serve as a support upon which the roof, in the collapsed position thereof, may rest.

Other objects and features of the present invention will become apparent from the following detailed description when taken in connection with the accompanying drawings which disclose several embodiments of the invention. It is to be understood that the drawings are designed for the purpose of ilustration only, and are not intended as a definition of the limits of the invention.

In the drawings, wherein similar reference characters denote similar elements throughout the several views:

FIG. 1 is a fragmentarily-illustrated, side elevational view of an automobile body in which a collapsible, convertible hard top roof embodying the present invention is incorporated;

FIG. 2 is an enlarged, sectional view taken along line 2—2 of FIG. 1, showing the roof in both its raised and collapsed positions;

FIG. 3 is a fragmentarily-illustrated, further enlarged perspective view showing a portion of the rear side window frame hingeably secured to a body side panel;

FIG. 4 is a fragmentarily-illustrated, enlarged longitudinal sectional view, in part elevation, of the roof, showing the raised, non-collapsed locked position of the roof front and rear panels, with portions broken away to show internal construction;

FIG. 5 is an enlarged, sectional view comparable to that of FIG. 4, but showing the initial upward displacement of the roof front panel to initiate the collapsing procedure, with portions broken away to show internal construction;

FIG. 6 is an enlarged sectional view, in part elevation, comparable to that of FIGS. 4 and 5, showing the front panel being slid rearwardly over the rear panel to continue the collapsing procedure;

FIG. 7 is an enlarged, top and side perspective view of the support and guide blocks used for locking and guiding the front panel relative to the rear panel of the roof;

FIG. 12 is an enlarged, perspective view of the car body showing an intermediate position of the roof collapsing procedure wherein the rear roof panel and the rear side window panels are pivoted downwardly;

FIG. 13 is an enlarged, fragmentarily-illustrated, longitudinal sectional view, showing in full line, the roof rear panel in a raised non-collapsed position and, in phantom line, in a lowered collapsed position;

FIG. 14 is an enlarged, fragmentarily-illustrated, perspective view showing the roof in a fully collapsed position with a portion of a cap disposed thereover;

FIG. 15 is a fragmentarily-illustrated longitudinal sectional view of an alternate embodiment showing both the roof assembly in a raised, non-collapsed position, as well as a lowered collapsed position;

Figure 9:
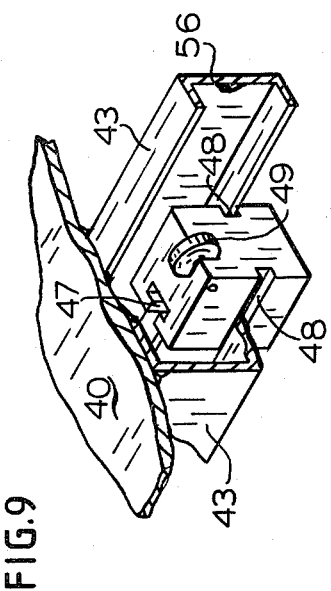
FIG. 9 is a fragmentarily-illustrated, perspective view showing the roof front panel guided on the guide block by means of a pair of C-shaped channels.

Referring now in detail to the accompanying drawings and, in particular, FIGS. 1, 2, 10, 12–14 and 16–18, therein illustrated is a generally conventional two-door, four or five passenger sedan or coupe, in which a collapsible, segmented, convertible hard top roof embodying the invention is incorporated. The car body includes a pair of body side panels 22, a pair of front doors 23, a pair of front fender panels 24, a hood 25, a front windshield 26 having a surrounding frame 27, and an upper tail or rear panel 28 (see FIG. 10). It further includes a passenger compartment composed of a front seat section having a pair of bucket seats 29 and a rear seat section having a pair of fold down rear seats 30.

The car body is also provided with a pair of rear side windows 31, each supported by a side window frame 32 so as to define a pair of side window panels. However, unlike the conventional construction, side window frames 32 are pivotably secured along their lower edge to body side panels 22 by means of a piano hinge 33. Hinge 33 has a lower hinge arm 34 secured to an interior vertical wall of panel 22 and an upper hinge arm 35 secured to the lower edge of frame 32, both by means of screws 26 (see FIG. 3). Hinge 33 is spring-loaded by means of an internally-disposed coil spring 37 which serves to maintain frames 32 in a generally upright position with respect to body side panels 22, with the upper arm 35 resting on a rubber seat 38. Of course, frames 32 can be pivoted inwardly and downwardly as shown by the arrows in FIG. 2 against the spring force (the purpose of which will be described in greater detail hereinafter).

Figure 8:
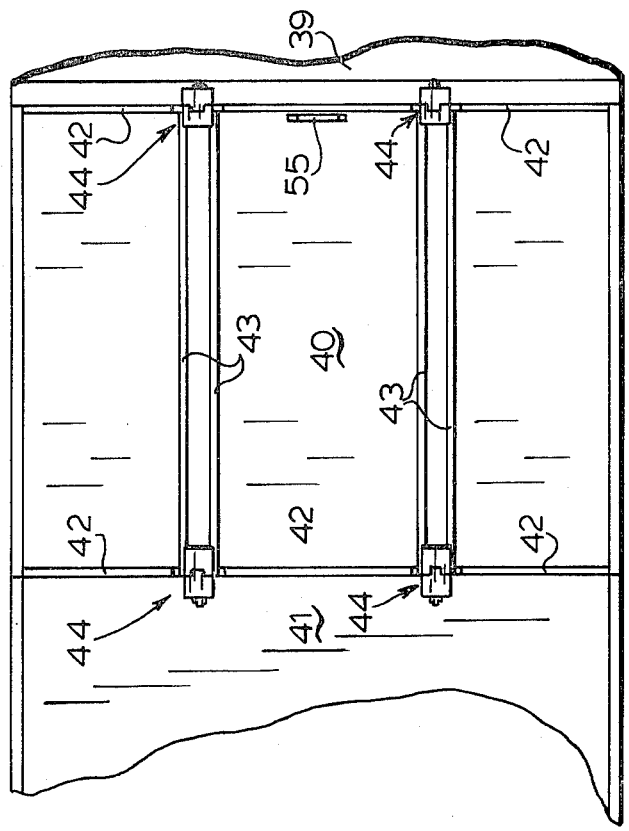
FIG. 8 is a fragmentarily-illustrated, enlarged bottom view of the underside of the roof, showing the front panel locked in its raised non-collapsed position.

As can be seen in FIG. 1, the car body is provided with a segmented hard top roof consisting essentially of a support bar 39 secured to the upper edge of front windshield frame 27, a front panel 40 and a rear panel 41 in which the rear window is incorporated. Front panel 40 serves as both a bridge and brace between support bar 39 and rear panel 41 and, as shown best in FIG. 8, is itself provided with structurally reinforcing braces 42 on the underside thereof. Also secured on the lower side of front panel 40 are two spaced-apart longitudinally-extending panel slide guides, each of which comprise a pair of opposing, spaced-apart C-shaped rails 43.

Associated with each pair of rails 43 are a pair of support and guide assemblies 44, which as shown in FIG. 7, each consist of a support block 45 and a slide guide block 46. Support block 45 has a generally box-shaped configuration and has a vertically extending T-shaped flange 47 extending outwardly from one lateral side thereof which is configured and dimensioned for sliding receipt in a complementary configured, vertically-extending T-shaped guide slot 47' provided in a lateral side of guide block 46. Guide block 46 is also provided with horizontally-extending, generally U-shaped guide slots 48 in the adjoining lateral sides thereof in which the lower arms of the C-shaped rails 43 may be slidably mounted. Guide block 46 also has a roller 49 projecting upwardly from its upper surface to assist the sliding of front panel 40 thereon.

As more clearly shown in FIGS. 4-6, support block 45 has a spring-loaded latch bolt 50 which is biased in an outwardly direction from a bore extending laterally through T-shaped flange 47. Bolt 50 is secured to a wire 51, which, in turn, is attached to one end of a lever 52, pivotably mounted on the lateral side of block 45 opposite the lateral side provided with T-shaped flange 47.

As shown in FIG. 8, there are a total of four support blocks 45 and guide blocks 46. Two support blocks 45 are each secured along their top face, such as by welding, to support bar 39 in alignment with one of the front panel slide guides. Similarly, two support blocks 45 are each secured in a similar fashion to a forward edge of rear panel 41. As shown more clearly in FIG. 4, in the raised and locked position of the roof, the slide blocks 46 are each slidably coupled to a support block 45 by the receipt of T-shaped flange 47 in guide slot 47' and they rest upon a supporting stop ledge 53 of support block 45. Although not illustrated, slot 47' could be provided with a locating stop-hole for receiving latch bolt 50 so as to lock guide block 50 in this position.

When it is desired to lower the roof, front panel 40 is initially raised as shown in FIG. 5 guided by the cooperation of flange 47 and slot 47' and it carries slide block 46 with it until it reaches the position shown in FIG. 6. At this point, latch bolts 50 support guide blocks 46 at a sufficient height such that front panel 40 is at a height slightly above rear panel 41, so as to permit front panel 40 to be slid rearwardly over rear panel 41 (see FIG. 10) guided by slide block 46 and its associated guide slots 48; with the sliding action being facilitated by roller 49 (the purpose of this feature will also be discussed in greater detail hereinafter).

Figure 10:
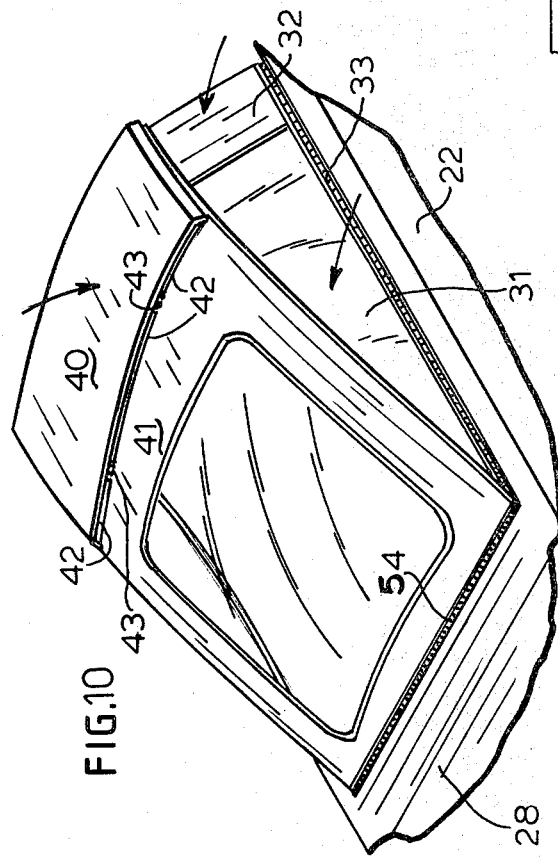
FIG. 10 is an enlarged, fragmentarily-illustrated, perspective view showing the front roof panel superimposed over the rear roof panel with initiation of the downward pivoting of the roof rear panel and the rear side window panels to continue the collapsing procedure.

As can be seen best in FIGS. 10 and 13, roof rear panel 41 is pivotably connected along its rear edge to tail panel 28 by means of a piano-type hinge 54, in a comparable fashion to the hinge connection of frame 32 to body side panel 22, for movement between a raised position and a lowered position, the latter of which is shown in phantom line in FIG. 13.

In operation, when it is desired to lower the roof from its raised position, front panel 40 would be upwardly displaced in the manner as previously described and pushed rearwardly over rear panel 41, aided by a handle 55 on the forward lower edge of front panel 40; in such a position the roof is positioned rearwardly of the front seat section. Guide rails 43 are provided with a locating stop 56 on their front edges (see FIG. 9) so as to limit the rearward movement of front panel 10 to the position shown in FIGS. 10 and 12. Then, the occupant would pull down on handle 55 so as to effect downward and inward pivoting of side window panels 32 and, in turn, roof rear panel 41. Immediately prior to pulling down on handle 55, the occupant would fold down rear seats 30 to permit the roof to be lowered such that it lies substantially flush with the upper edges of body side panels 22. To raise the roof, the procedure would simply be reversed.

Figure 11:
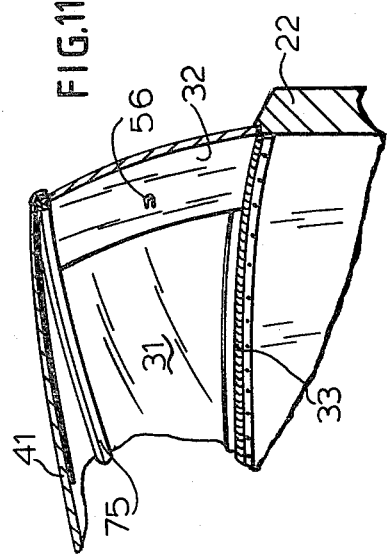
FIG. 11 is an enlarged, fragmentarily-illustrated perspective view showing the rear side window panel in its fully raised position.
Figure 17:
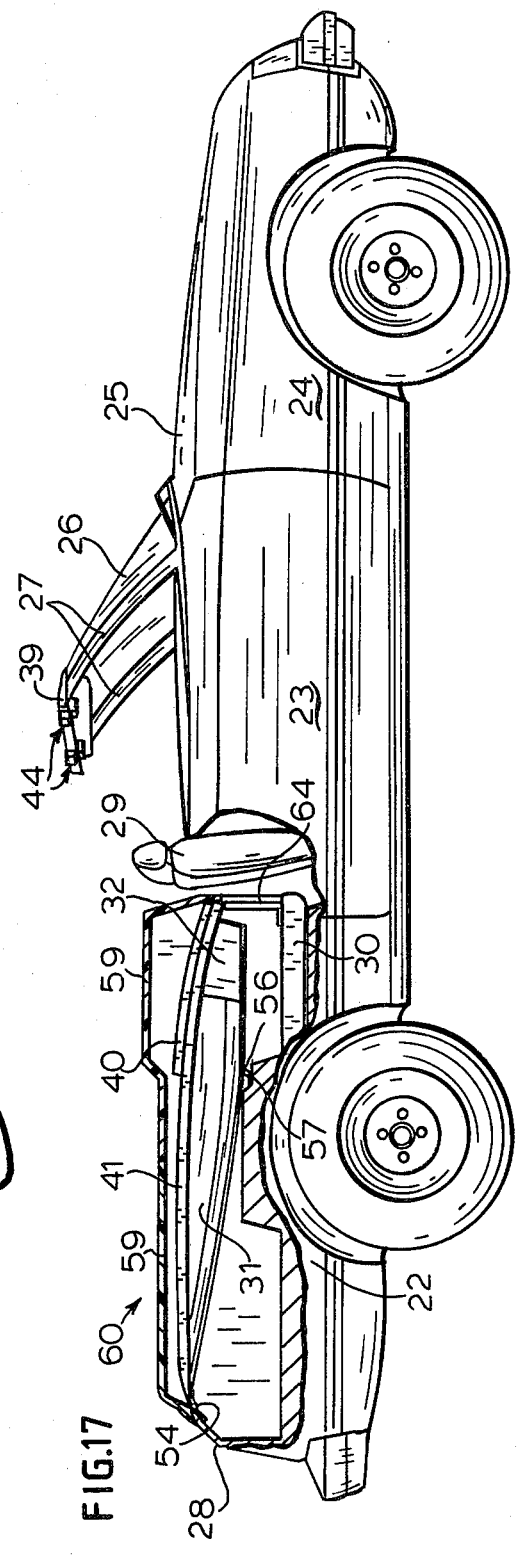
FIG. 17 is an enlarged, side elevational view of an automobile, with portions broken away to show the roof assembly in a fully collapsed position, covered by the cap.
Figure 18:
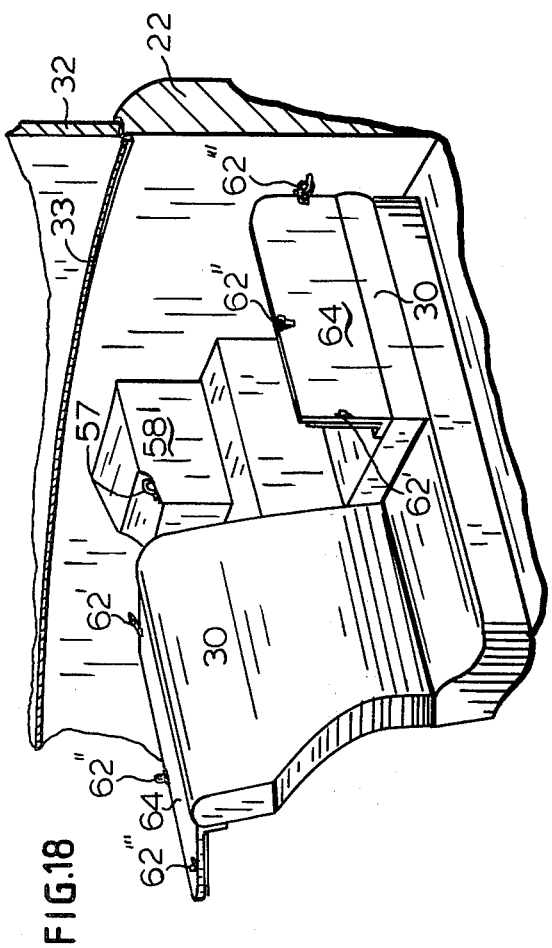
FIG. 18 is an enlarged, fragmentarily-illustrated, perspective view showing a portion of the passenger compartment interior of the car with one of its rear seats in an up position and the other of the rear seats in a down position.

To facilitate locking of the roof and side window panels in the lower position, the inner side of side window frame 32 may be advantageously provided with a resilient U-shaped friction clip 56 (see FIG. 11) which is intended to frictionally engage a cooperating mounting element 57 secured to a rear wheel well 58 which is exposed by the folding of rear seats 30 (see FIG. 18). If desired, a cap 60 or cover could then be placed over the collapsed roof and side panel assembly to provide a more aesthetically pleasing appearance as shown in FIGS. 14, 16 and 17.

Figure 16:
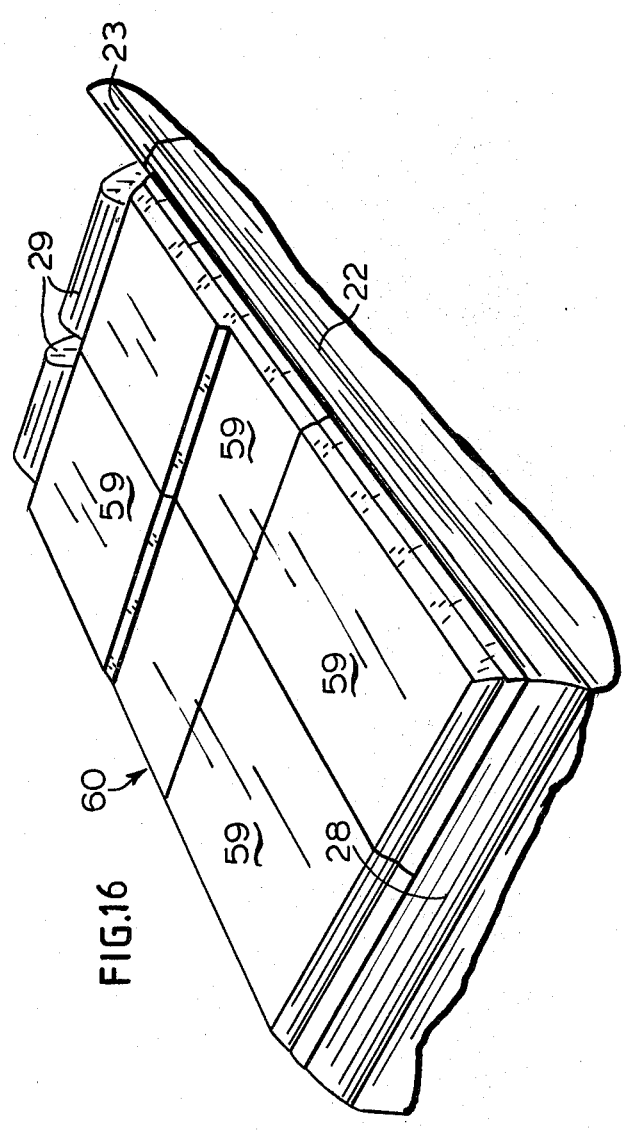
FIG. 16 is an enlarged, fragmentarily-illustrated, perspective view showing the roof in a fully collapsed position with a cap in place.
Figure 19:
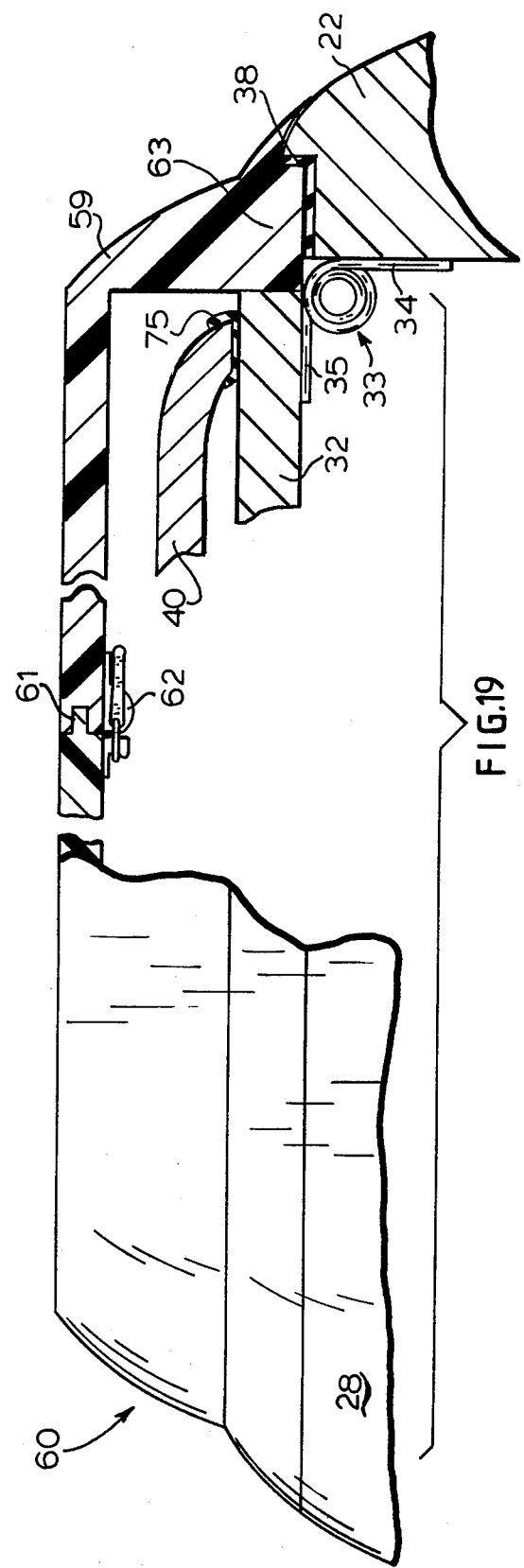
FIG. 19 is an enlarged, fragmentarily-illustrated, side elevational view of the installed cap assembly, in part section, showing its mounting in relation to the collapsed roof structure.

The cap may comprise a single rigid plastic or metal sheet (not shown), or it could preferably comprise four quarter panels 59 as shown in FIG. 16 so as to permit storage in the trunk or rear of the car. As shown in FIG. 19, the panels may be joined together by tongue and groove joints 61, as well as by conventional draw-ketch latches 62. Cap 60 is further provided with an outer depending rim 63 which is contoured to effect mating engagement with the exposed hinge area of hinge 33, as well as hinge 54.

As can be seen in FIGS. 17 and 18, an L-shaped support plate 64 is attached to the rear side of rear seats 30 which, when the seat is folded down, serves as a support for both the roof and cap 60. As seen best in FIG. 17, support plate 64 has double-ply construction so as to define a two-tiered, stepped edge consisting of a lower inner edge which supports the front edge of rear panel 41, and a higher outer edge, which supports rim 63 of cap 60. As shown in FIG. 18, conventional latches 62 or any other suitable clamping means may be provided to lock the support plates 64 together (clasps 62'), to lock the cap 60 to the support plates 64 (clasps 62''), and to lock support plates 64 to body side panels 22 (clasps 62''').

Figure 20:
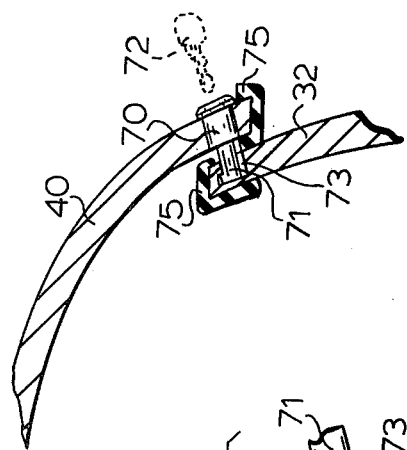
FIG. 20 is an enlarged, fragmentarily-illustrated, sectional view showing the side window panel locked to the roof structure by means of a cylinder-type lock.
Figure 21:
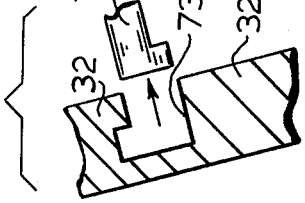
FIG. 21 is an enlarged, fragmentarily-illustrated, sectional view, in part elevation, showing the lock assembly in greater detail.

As illustrated in FIGS. 20 and 21, a cylinder-type lock 70 may be mounted in roof rear panel 41, adjacent to each of the lateral sides thereof, for locking the same to the side window frames 32 when in the raised position. Cylinder-lock 70 has a pivotable L-shaped latch bolt 71 which is pivotable, upon insertion and turning of a key 72, between a locking position (FIG. 20) and an unlocking position (FIG. 21) with respect to a complementary-configured latch bore 73 provided in the upper edge of side window frame 32.

In order to prevent the roof components from scratching one another during the collapsing procedure, the various members such as side window frames 32, front panel 40 and rear panel 41 are provided with rubber gaskets or seals 75 along certain edges thereof (see FIGS. 4-6 and 20). These seals also serve as weatherstripping so as to ensure the provision of a highly effective seal between the roof components when they are in a raised, non-collapsed position.

FIG. 15 illustrates an alternate embodiment of the invention which may be more suited for a Landau-type roof rather than the fastback coupe style shown in the other figures. In this case, the rear window is encased in a rear window panel 76 which is hingeably secured to rear panel 28' by a hinge 54' rather than rear panel 41'. Upon collapsing, rear window panel 76 would be folded down first, followed by the side window panels (not shown) and finally rear panel 41'.

It should, of course, be realized that various modifications may be made as will be apparent to those skilled in the art. For example, the support blocks and guide blocks could possibly be replaced by both slidable and pivotable linkage means for displacing the front roof panel relative to the rear roof panel. In addition, it may be necessary to reverse the folding order of the various roof components depending on the body style of the car. Furthermore, various types of locking means may be employed in place of the cylinder lock and other fastening members disclosed for locking the roof structure in either of its raised or collapsed positions.

It should be pointed out that as used herein, the terms "hard top coupe" or "sedan body" are used synonymously and may also include hard top sports car bodies. In addition, although it has been previously indicated that the invention is concerned with the conversion of a four passenger coupe or sedan body into a two seater, open top roadster, it is generally applicable to any hard top car body having a rear compartment, although not necessarily a rear compartment containing rear seats. As an example, the present invention would appear to be particularly suitable for converting a two passenger Datsun 280Z sports car into a two seater open top roadster, in the latter position of which the roof collapses over the rear section of the passenger compartment located behind the front seats.

Thus, while only several embodiments of the present invention have been shown and described, it will be obvious that many changes and modifications may be made thereunto, without departing from the spirit and scope of the invention.

What is claimed is:

1. An automobile body of the type having a front windshield and a passenger compartment which includes a pair of body side panels between which is disposed a front seat section and a rear seat section, the improvement comprising:

a collapsible, segmented convertible hard top roof mounted for movement between a raised, non-collapsed position, in which said roof extends from an upper edge of said front windshield rearwardly over said front and rear sections of said passenger compartment at a sufficient height so that said body assumes the general configuration of a hard top four passenger sedan body, and a lowered collapsed position, in which said roof extends substantially over only the rear seat section of said passenger compartment at a lower height such that it lies substantially flush with the upper edges of said body side panels so that said body assumes the general configuration of a two-passenger open top roadster, said roof having a front panel and a rear panel which, when said roof is disposed in said raised, non-collapsed position, extends over said front seat section and said rear seat section, respectively, said roof also including means for pivotably mounting said rear panel along a rear edge thereof to a rear portion of said body so as to permit movement thereof between said raised and collapsed positions relative to said rear seat section and means for coupling said front panel to said rear panel for movement between said raised, non-collapsed position in which said front panel lies between said rear panel and said front windshield, and said lower, collapsed position, in which said front panel is slid upwardly and rearwardly such that it is superimposed over said rear panel so as to uncover said front seat section, said roof also including a pair of rear, side window panels disposed on opposite sides of said roof rear panel along one of said body side panels and means for pivotably mounting said rear, side window panels along a lower edge thereof to the associated body side panel for movement between said raised, non-collapsed position, in which said rear, side window panels assume a generally vertical disposition for supporting said rear panel and a lowered collapsed position, in which said rear side window panels are pivoted inwardly towards the interior of said body so that they assume a generally horizontal disposition and lie substantially flush with the upper edge of said body side panels.

2. The automobile body according to claim 1, wherein said means for pivotably mounting said roof rear panel and said rear, side window panels comprise an elongated hinge.

3. The automobile body according to claim 1, additionally including means for releasably securing said roof in said raised, non-collapsed position and said lowered collapsed position.

4. The automobile body according to claim 1, additionally including a cap for covering said roof when in said lower, collapsed position thereof.

5. The automobile body according to claim 4, wherein said cap comprises a segmented rigid plastic sheet.

6. The automobile body according to claim 1, wherein said passenger compartment has at least one fold down rear seat having a rear side and wherein a support element is secured to said rear side of said seat which, when said seat is folded down projects upwardly in a generally vertical disposition so as to serve as a support upon which said roof, in said collapsed position thereof, may rest.

* * * * *